(12) United States Patent
Derelöv et al.

(10) Patent No.: US 12,286,991 B2
(45) Date of Patent: Apr. 29, 2025

(54) SET OF PANELS WITH A MECHANICAL LOCKING DEVICE

(71) Applicant: Välinge Innovation AB, Viken (SE)

(72) Inventors: Peter Derelöv, Helsingborg (SE); Johan Svensson, Nyvång (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

(21) Appl. No.: 18/383,242

(22) Filed: Oct. 24, 2023

(65) Prior Publication Data

US 2024/0133407 A1 Apr. 25, 2024
US 2024/0229844 A9 Jul. 11, 2024

Related U.S. Application Data

(63) Continuation of application No. 17/154,344, filed on Jan. 21, 2021, now Pat. No. 11,828,311.

(30) Foreign Application Priority Data

Jan. 22, 2020 (SE) .................... 2050057-5

(51) Int. Cl.
*F16B 12/24* (2006.01)
*A47B 47/04* (2006.01)
(Continued)

(52) U.S. Cl.
CPC ............ *F16B 12/24* (2013.01); *A47B 47/042* (2013.01); *F16B 12/125* (2013.01);
(Continued)

(58) Field of Classification Search
CPC .. F16B 12/24; F16B 12/125; F16B 2012/103; F16B 12/26; F16B 12/46; F16B 12/20;
(Continued)

(56) References Cited

U.S. PATENT DOCUMENTS 4,194,642 A 3/1980 Glavan
4,236,848 A 12/1980 Roeck et al.
(Continued)

FOREIGN PATENT DOCUMENTS

CN 208503171 U 2/2019
FR 2905740 A1 3/2008
(Continued)

OTHER PUBLICATIONS

International Search Report and Written Opinion mailed Feb. 17, 2021 in PCT/SE2021/050034, ISA/SE, Patent-och reaistrerinasverket, Stockholm, SE, 16 pages.
(Continued)

*Primary Examiner* — Hiwot E Tefera
(74) *Attorney, Agent, or Firm* — Boone IP Law

(57) ABSTRACT

A set including a first panel, a second panel and a mechanical locking device for locking the first panel to the second panel. The first edge surface is facing the second panel surface in a locked position of the first and the second panel, the mechanical locking device includes a rod-shaped element at the first edge surface and an insertion groove at the second panel surface, the rod-shaped element is configured to be inserted into the insertion groove. A first locking groove at the first edge surface and a second locking groove at the second panel surface and a locking part, where the locking part is configured to be inserted into the first locking groove and the second locking groove. The locking part is configured to apply a locking force between the first and the second panel in an oblique direction in relation to the second panel surface.

20 Claims, 7 Drawing Sheets

(51) Int. Cl.
    *F16B 12/12*          (2006.01)
    *F16B 12/10*          (2006.01)
(52) U.S. Cl.
    CPC ... *A47B 2230/0037* (2013.01); *A47B 2230/06* (2013.01); *F16B 2012/103* (2013.01)
(58) Field of Classification Search
    CPC ...... F16B 12/2009; F16B 12/10; F16B 12/12; F16B 5/0614; A47B 47/042; A47B 2230/0037; A47B 2230/06; A47B 47/0075; A47B 2230/0081; A47B 2230/0096; A47B 2095/006
    See application file for complete search history.

(56)            References Cited

U.S. PATENT DOCUMENTS

| | | | |
|---|---|---|---|
| 4,332,495 A | 6/1982 | Burgers | |
| 4,599,011 A * | 7/1986 | Tashiro | F16B 35/041 403/245 |
| 4,869,564 A * | 9/1989 | Lechman | A47B 13/003 403/231 |
| 5,403,109 A * | 4/1995 | Johnson | F16B 12/2036 403/231 |
| 5,823,701 A | 10/1998 | Goto | |
| 6,176,638 B1 | 1/2001 | Kellison et al. | |
| 6,578,341 B2 | 6/2003 | Hoffmann et al. | |
| 8,887,468 B2 | 11/2014 | Hakansson et al. | |
| 9,375,085 B2 | 6/2016 | Derelv | |
| 9,538,842 B2 | 1/2017 | Hkansson et al. | |
| 9,655,442 B2 | 5/2017 | Boo et al. | |
| 9,714,672 B2 | 7/2017 | Derelv | |
| 9,723,923 B2 | 8/2017 | Derelv | |
| 9,726,210 B2 | 8/2017 | Derelv et al. | |
| 9,945,121 B2 | 4/2018 | Derelv | |
| 10,034,541 B2 | 7/2018 | Boo et al. | |
| 10,202,996 B2 | 2/2019 | Hkansson et al. | |
| 10,415,613 B2 | 9/2019 | Boo | |
| 10,448,739 B2 | 10/2019 | Derelov et al. | |
| 10,451,097 B2 | 10/2019 | Brnnstrm et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelv et al. | |
| 10,669,716 B2 | 6/2020 | Derelv | |
| 10,670,064 B2 | 6/2020 | Derelv | |
| 10,724,564 B2 | 7/2020 | Derelv | |
| 10,731,688 B2 | 8/2020 | Brnnstrm et al. | |
| 10,736,416 B2 | 8/2020 | Derelv et al. | |
| 10,830,266 B2 | 11/2020 | Fridlund | |
| 10,830,268 B2 | 11/2020 | Boo | |
| 10,871,179 B2 | 12/2020 | Hkansson et al. | |
| 10,876,562 B2 | 12/2020 | Pervan | |
| 10,876,563 B2 | 12/2020 | Derelv et al. | |
| 10,968,936 B2 | 4/2021 | Boo et al. | |
| 11,076,691 B2 | 8/2021 | Boo | |
| 11,083,287 B2 | 8/2021 | Boo et al. | |
| 11,098,484 B2 | 8/2021 | Derelov | |
| 11,137,007 B2 | 10/2021 | Fridlund | |
| 11,204,051 B2 | 12/2021 | Brnnstrm et al. | |
| 11,246,415 B2 | 2/2022 | Derelov et al. | |
| 11,272,783 B2 | 3/2022 | Derelv | |
| 2003/0070381 A1 | 4/2003 | Hawang | |
| 2007/0160418 A1 | 7/2007 | Lo | |
| 2011/0121560 A1 | 5/2011 | Readman | |
| 2011/0286792 A1* | 11/2011 | Henriott | F16B 12/46 403/375 |
| 2012/0216389 A1* | 8/2012 | Becker | B63B 32/53 403/292 |
| 2012/0279161 A1 | 11/2012 | Hakansson et al. | |
| 2015/0035422 A1 | 2/2015 | Hakansson et al. | |
| 2015/0078807 A1 | 3/2015 | Brnnstrm et al. | |
| 2015/0078819 A1 | 3/2015 | Derelv et al. | |
| 2015/0196118 A1 | 7/2015 | Derelv | |
| 2015/0198191 A1 | 7/2015 | Boo | |
| 2015/0211567 A1 | 7/2015 | Susnjara | |
| 2016/0007751 A1 | 1/2016 | Peter | |
| 2016/0174704 A1 | 6/2016 | Boo et al. | |
| 2016/0223001 A1* | 8/2016 | Broughton | F16B 12/24 |
| 2016/0270531 A1 | 9/2016 | Peter | |
| 2017/0079433 A1 | 3/2017 | Derelov et al. | |
| 2017/0089379 A1 | 3/2017 | Pervan | |
| 2017/0097033 A1 | 4/2017 | Hakansson et al. | |
| 2017/0159291 A1 | 6/2017 | Derelv | |
| 2017/0208938 A1 | 7/2017 | Derelv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelv | |
| 2017/0360193 A1 | 12/2017 | Boo et al. | |
| 2018/0080488 A1 | 3/2018 | Derelv | |
| 2018/0087552 A1 | 3/2018 | Derelv et al. | |
| 2018/0112695 A1 | 4/2018 | Boo et al. | |
| 2018/0119717 A1 | 5/2018 | Derelv | |
| 2018/0135677 A1* | 5/2018 | Cattaneo | F16B 12/2036 |
| 2018/0202160 A1 | 7/2018 | Derelv | |
| 2018/0245618 A1* | 8/2018 | Cattaneo | F16B 12/46 |
| 2018/0328396 A1 | 11/2018 | Fransson et al. | |
| 2018/0368575 A1* | 12/2018 | Dalstam | F16B 12/24 |
| 2019/0113061 A1 | 4/2019 | Hakansson et al. | |
| 2019/0166989 A1 | 6/2019 | Boo et al. | |
| 2019/0191870 A1 | 6/2019 | Derelv | |
| 2019/0195256 A1 | 6/2019 | Derelv | |
| 2019/0289999 A1 | 9/2019 | Derelv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelv | |
| 2019/0323535 A1 | 10/2019 | Derelv | |
| 2020/0003242 A1 | 1/2020 | Brnnstrm et al. | |
| 2020/0055126 A1 | 2/2020 | Fridlund | |
| 2020/0069048 A1 | 3/2020 | Derelv et al. | |
| 2020/0069049 A1 | 3/2020 | Derelv et al. | |
| 2020/0102978 A1 | 4/2020 | Fridlund | |
| 2020/0121076 A1 | 4/2020 | Derelov et al. | |
| 2020/0214447 A1 | 7/2020 | Derelov et al. | |
| 2020/0300284 A1 | 9/2020 | Pervan | |
| 2020/0337455 A1 | 10/2020 | Boo et al. | |
| 2020/0340513 A1 | 10/2020 | Derelv | |
| 2021/0079650 A1 | 3/2021 | Derelov | |
| 2021/0148392 A1 | 5/2021 | Brnnstrm et al. | |
| 2021/0180630 A1 | 6/2021 | Bruno et al. | |
| 2021/0190112 A1 | 6/2021 | Derelv | |
| 2021/0207635 A1 | 7/2021 | Hkansson et al. | |
| 2021/0262507 A1 | 8/2021 | Svensson et al. | |
| 2021/0262508 A1 | 8/2021 | Svensson et al. | |
| 2021/0276108 A1 | 9/2021 | Derelv et al. | |
| 2021/0285480 A1 | 9/2021 | Derelv et al. | |
| 2021/0381251 A1 | 12/2021 | Svensson | |
| 2022/0018373 A1 | 1/2022 | Boo | |
| 2022/0049735 A1 | 2/2022 | Meijer | |

FOREIGN PATENT DOCUMENTS

| | | |
|---|---|---|
| JP | S52129 U | 6/1975 |
| JP | S50138972 A | 11/1975 |
| JP | S5218731 U | 2/1977 |
| JP | S53113160 U | 9/1978 |
| JP | 57-175803 U | 11/1982 |
| JP | 3030394 U | 10/1996 |
| JP | 2019516913 A | 6/2019 |
| WO | 2009/136195 A1 | 11/2009 |
| WO | 2020/046193 A1 | 3/2020 |
| WO | 2020/046194 A1 | 3/2020 |

OTHER PUBLICATIONS

Office Action received for Chinese Patent Application No. 202180010013.5, mailed on Sep. 20, 2023, 12 pages (6 pages of English Translation and 6 pages of Original Document).

(56) References Cited

OTHER PUBLICATIONS

Supplementary European Search Report and Search Opinion received for EP Application No. 21744068.4, mailed on Dec. 19, 2023, 6 pages.
U.S. Appl. No. 16/553,350, Peter Derelöv, filed Aug. 28, 2019.
U.S. Appl. No. 16/856,765, Peter Derelöv, filed Apr. 23, 2020.
U.S. Appl. No. 17/173,823, Peter Derelöv, filed Feb. 11, 2021.
U.S. Appl. No. 17/185,428, Johan Svensson, filed Feb. 25, 2021.
U.S. Appl. No. 17/185,403, Johan Svensson, filed Feb. 25, 2021.
U.S. Appl. No. 17/370,521, Christian Boo, filed Jul. 8, 2021.
U.S. Appl. No. 17/588,733, Peter Derelöv, filed Jan. 31, 2022.
U.S. Appl. No. 17/674,262, Johan Svensson, filed Feb. 17, 2022.
U.S. Appl. No. 17/709,994, Johan Svensson, filed Mar. 31, 2022.
U.S. Appl. No. 17/710,055, Johan Svensson, filed Mar. 31, 2022.
U.S. Appl. No. 17/883,203, Christian Boo, filed Aug. 8, 2022.
U.S. Appl. No. 17/886,517, Peter Derelöv, filed Aug. 12, 2022.
U.S. Appl. No. 18/191,444, Johan Svensson, filed Mar. 28, 2023.
U.S. Appl. No. 18/312,808, Johan Svensson, filed May 5, 2023.
U.S. Appl. No. 18/729,224, Johan Svensson, filed Jul. 16, 2024.
U.S. Appl. No. 18/764,217, Thomas Meijer, filed Jul. 4, 2024.
Office Action issued by the Japanese Patent Office in JP Application No. 2022543028 on Jan. 7, 2025 (23 pages).
U.S. Appl. No. 18/983,417, Thomas Meijer, Dec. 17, 2024.

* cited by examiner

FIG. 5A
FIG. 5C
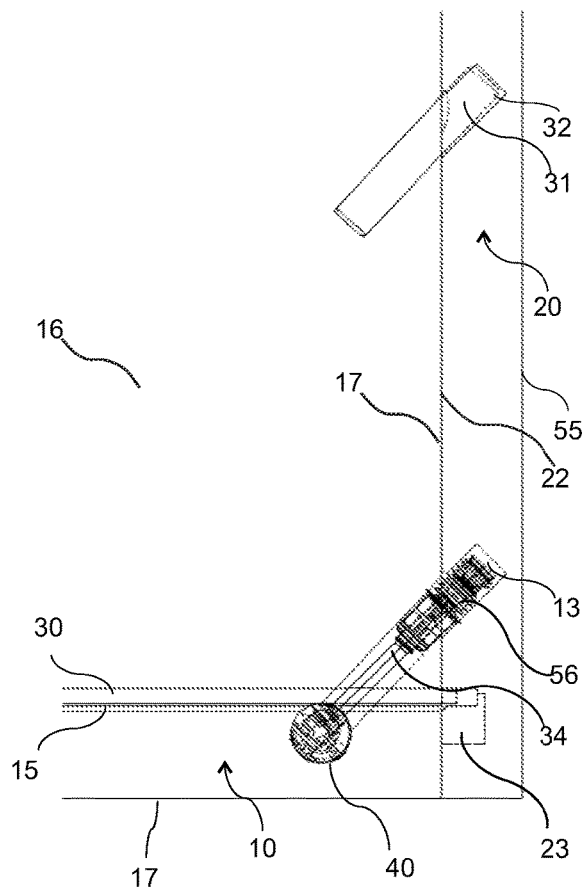
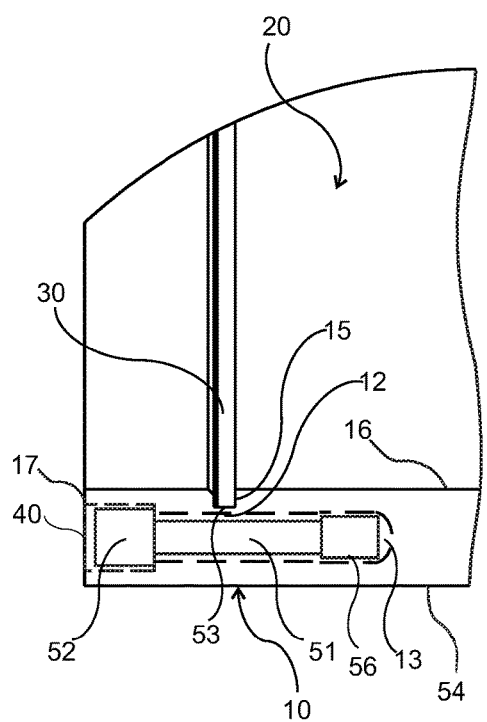
FIG. 5B
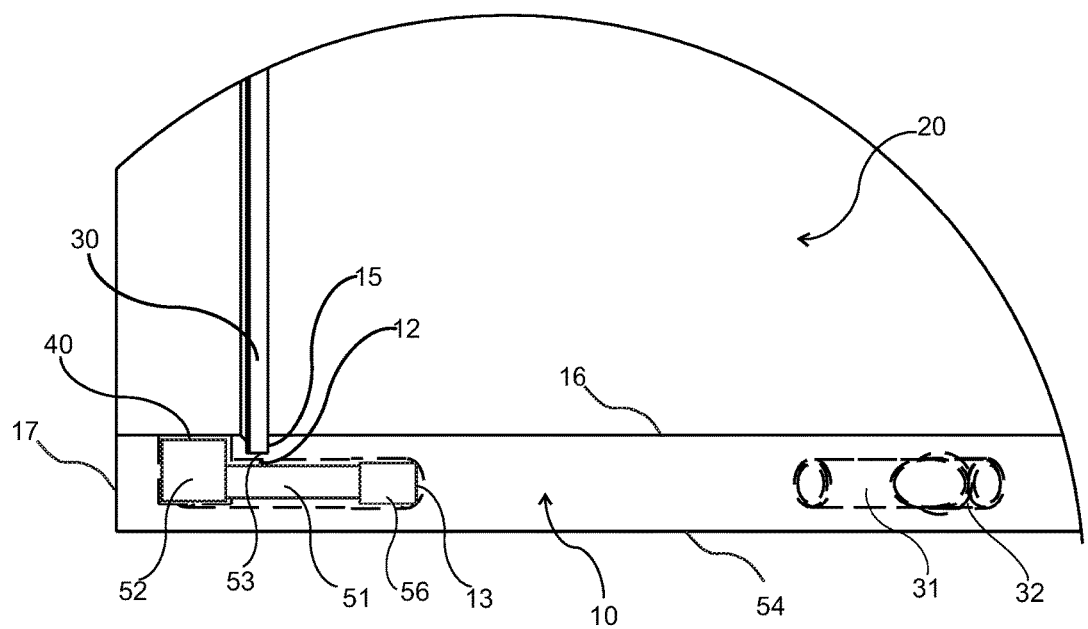

SET OF PANELS WITH A MECHANICAL LOCKING DEVICE

CROSS REFERENCE TO RELATED APPLICATIONS

The present application is a continuation of U.S. application Ser. No. 17/154,344, filed on Jan. 21, 2021, which claims the benefit of Swedish Application No. 2050057-5, filed on Jan. 22, 2020. The entire contents of U.S. application Ser. No. 17/154,344 and Swedish Application No. 2050057-5 are hereby incorporated herein by reference in their entirety.

TECHNICAL FIELD

Embodiments of the present invention relate to panels configured to be locked together with a mechanical locking device. The panels may be assembled and locked together to obtain a furniture product, such as a bookshelf, a cupboard, a wardrobe, a box, a drawer, or a furniture component.

TECHNICAL BACKGROUND

A furniture product provided with a mechanical locking is disclosed in PCT/SE2019/050801 or PCT/SE2019/050802. The furniture products earlier described comprise a first panel connected perpendicular to a second panel by a mechanical locking device comprising a rod-shaped element extending at an angle.

The above description of various known aspects is the applicant's characterization of such, and is not an admission that any of the above description is considered as prior art.

Embodiments of the present invention address a need to provide panels that may be easily assembled, having an improved stiffness and strength of the mechanical locking device.

SUMMARY

It is an object of certain aspects of the present invention to provide an improvement over the above described techniques and known art. A specific objective is to improve assembling of panels, such as furniture panels, locked together by a mechanical locking device. The panels may be a part of a furniture product, such as a furniture component, a drawer, a cupboard, a bookshelf, a wardrobe, a kitchen fixture, or a box.

A further object of at least certain aspects of the present invention is to facilitate assembling of panels configured to be assembled with a locking device that is easy to manufacture and to use.

A further object of at least certain aspects of the present invention is to facilitate assembling of panels configured to be assembled with a locking device that is easy to manufacture and to use and which reduces the risk of incorrect installation thereof.

A further object of at least certain aspects of the present invention is to facilitate assembling of panels configured to be assembled in a more stable and aesthetic way.

At least some of these and other objects and advantages that will be apparent from the description have been achieved by a set comprising a first panel, a second panel and a mechanical locking device for locking the first panel to the second panel, wherein the first panel comprises a first edge surface and a second panel surface, the second panel comprises a second panel surface, the first edge surface is facing the second panel surface in a locked position of the first and the second panel, the mechanical locking device comprises at least one rod-shaped element at the first edge surface and at least one insertion groove at the second panel surface, the rod-shaped element is configured to be inserted into the insertion groove, the mechanical locking device further comprises at least one first locking groove at the first edge surface and at least one second locking groove at the second panel surface and at least one locking part, the locking part is configured to be inserted into the first locking groove and the second locking groove, wherein the locking part is configured to apply a locking force between the first and the second panel in an oblique direction in relation to the second panel surface.

According to an aspect the set is configured for locking the first panel to the second panel with the first panel surface perpendicular or essentially perpendicular to the second panel surface.

According to an aspect the locking part is configured to pull the first panel and the second panel together in an assembly direction.

According to an aspect the oblique direction is essentially parallel to a length direction and/or axial direction of the rod-shaped element.

According to an aspect the rod-shaped element is configured to cooperate with the insertion groove to guide the first and second panel together during assembly.

According to an aspect the rod-shaped element is configured to cooperate with insertion groove to guide the first and second panel to the locked position by a displacement of the second panel surface relative the first edge surface in a first direction and/or a second direction.

According to an aspect the rod-shaped element extends at a first angle from the first edge surface, wherein the first angle is within the range of about 10° to 80°, preferably within the range of about 40° to 50°, or preferably about 45°.

According to an aspect the insertion groove extends into the second panel surface at a second angle from the second panel surface, wherein the second angle is within the range of about 10° to 80°, preferably within the range of about 40° to 50°, or preferably about 45°.

According to an aspect said first locking groove extends at a third angle from the first edge surface, wherein the third angle is within the range of about 10° to 80°, preferably within the range of about 40° to 50°, or preferably about 45°.

According to an aspect said second locking groove extends at a fourth angle from the second panel surface, wherein the fourth angle is within the range of about 10° to 80°, preferably within the range of about 40° to 50°, or preferably about 45°.

According to an aspect the first angle, the second angle, the third angle and the fourth angle are essentially the same. For example, the first angle, the second angle, the third angle and the fourth angle may be within 2° of each other. Further, the first angle, the second angle, the third angle and the fourth angle may be the same.

According to an aspect the first angle, the second angle, the third angle and the fourth angle are all ≠90°.

According to an aspect the locking part is a screw.

According to an aspect the screw extends into the second panel during assembly.

According to an aspect the first locking groove extends from a second edge surface to the first edge surface.

According to an aspect the locking part is of the type cam and dowel connector.

According to an aspect the cam and dowel connector comprises at least one bolt and at least one connector housing.

According to an aspect the bolt of the cam and dowel connector is positioned in the first locking groove before assembly of the first panel and the second panel.

According to an aspect the connector housing is positioned in a first opening on the first panel.

According to an aspect the set comprises a first panel groove on a first panel surface of the first panel, and a second panel groove on the second panel surface of the second panel.

According to an aspect the set further comprises a back panel configured to be inserted in, and optionally to cooperate with, the first and second panel groove.

According to an aspect the first opening is positioned between the first panel groove and the second edge surface.

According to an aspect the insertion groove, the first locking groove, the second locking groove and/or the first opening is a drill hole.

According to an aspect the drill hole is a bottom-ended drill hole.

According to an aspect the locking part is configured to cooperate with the first locking groove and/or the second locking groove.

According to an aspect the first edge surface comprises one first locking groove and the second panel surface comprises one second locking groove.

According to an aspect the rod-shaped element is arranged in a rod-element groove at the first edge surface.

According to an aspect the number of rod-shaped elements at the first edge surface is the same as the number of insertion grooves at the second panel surface.

According to an aspect the core of the first panel and/or of the second panel may be a wood-based core, preferably made of MDF, HDF, OSB, WPC, plywood, or particleboard. The core may also be a plastic core comprising thermosetting plastic or thermoplastic, e.g., vinyl, PVC, PU or PET. The plastic core may comprise fillers.

The first panel and/or the second panel may also be of solid wood.

The first panel and/or the second panel may be provided with a decorative layer, such as a foil or a veneer, on one or more surfaces.

BRIEF DESCRIPTION OF THE DRAWINGS

These and other aspects, features, and advantages of which embodiments of the invention are capable of, will be apparent and elucidated from the following description of embodiments and aspects of the present invention, reference being made to the accompanying drawings, in which

FIG. 5A shows an enlargement of part of the embodiment shown in FIG. 3. The locking part is of the type cam and dowel connector.

FIG. 5B shows the part in FIG. 5A in a side-view.

FIG. 5C shows an enlarged side-view of an embodiment of the invention.

DETAILED DESCRIPTION

Figure 1A:
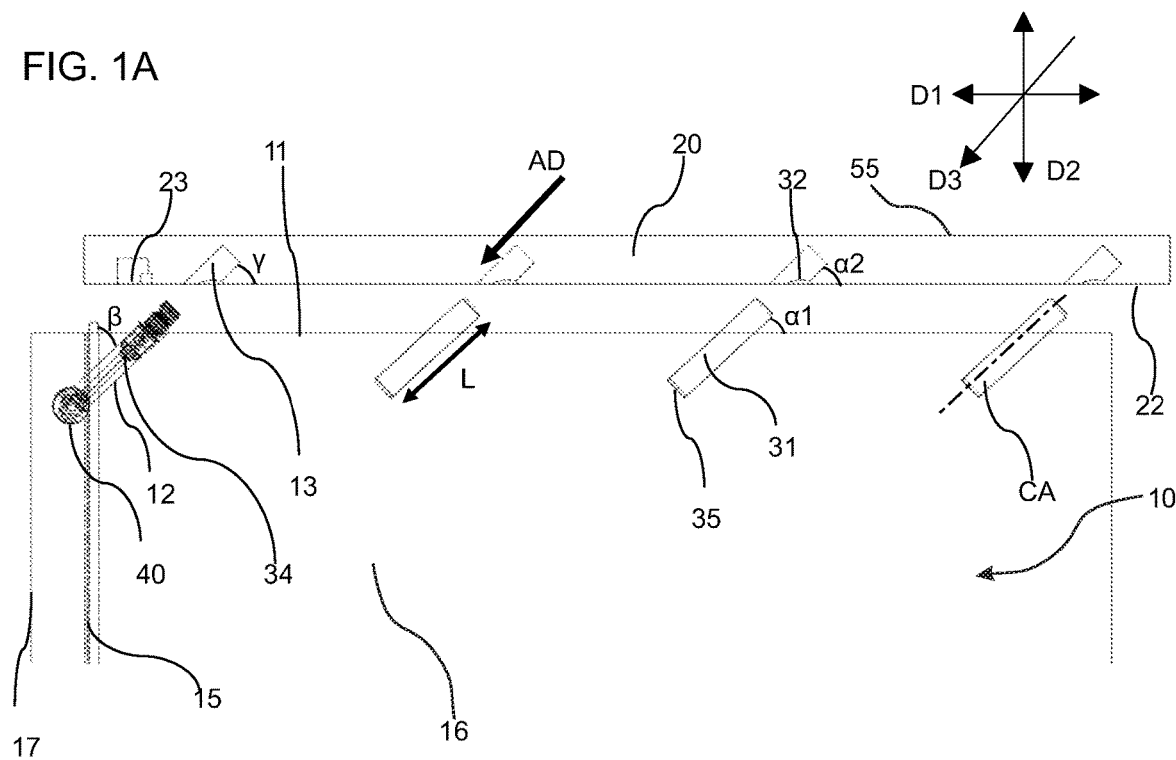
FIG. 1A shows an embodiment of the first panel and the second panel in a side-view in a non-locked position. The locking part is of the type cam and dowel connector.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications may be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

When the word "about" is used in this specification in connection with a numerical value, it is intended that the associated numerical value include a tolerance of +/−10% around the stated numerical value.

The different aspects, alternatives and embodiments of the invention disclosed herein may be combined with one or more of the other aspects, alternatives and embodiments described herein. Two or more aspects may be combined.

Embodiments of the invention are shown in FIGS. 1-6 including a set comprising a first panel 10, a second panel 20 and a mechanical locking device for locking of the first panel 10 to the second panel 20. The first panel 10 comprises a first panel surface 16 and a first edge surface 11. The second panel 20 comprises a second panel surface 22. The first edge surface 11 is facing the second panel surface 22 in a locked position of the first and the second panel 10,20. The mechanical locking device comprises at least one rod-shaped element 31 at the first edge surface 11 and at least one insertion groove 32 at the second panel surface 22. The rod-shaped element 31 is configured to be inserted into the insertion groove 32. The mechanical locking device further comprises at least one first locking groove 12 at the first edge surface 11 and at least one second locking groove 13 at the second panel surface 22 and at least one locking part 34. The locking part 34 is configured to be inserted into the first locking groove 12 and the second locking groove 13. The locking part 34 is configured to apply a locking force between the first and the second panel 10,20 in an oblique direction D3 in relation to the second panel surface 22. The locking force at least acts to prevent separation of the first panel from the second panel.

The first panel 10 and the second panel 20 are preferably panels for a furniture product and may be a part of a frame of a furniture product.

The set is preferably configured for locking the first panel 10 to the second panel 20 with the first panel surface 16 perpendicular or essentially perpendicular to the second panel surface 22.

The first panel 10 may comprise a third panel surface 54 which is opposite to the first panel surface 16. The second panel 20 may comprise a fourth panel surface 55 which is opposite to the second panel surface 22.

The first panel surface 16 preferably meets the second panel surface 22 in a locked position of the first panel 10 and the second panel 20.

The first panel surface 16 preferably meets the second panel surface 22 at an inner corner of the assembled set.

FIGS. 1-2A, 4A, 6A, and 6B disclose a set according to an aspect in an unassembled state. The set may be assembled by displacing the first panel 10 relative the second panel 20 in an assembly direction AD. FIGS. 2B, 3, 4B, and 5A-5C disclose a set according to an aspect in an assembled state.

The locking part 34 may be configured to pull the first 10 and the second panel 20 together in the assembly direction AD.

The oblique direction D3 may be essentially parallel to a length direction L and/or axial direction CA of the rod-shaped element 31. For example, the oblique direction D3 may be within 2° of the length direction L and/or axial direction CA of the rod-shaped element 31. Further, the oblique direction D3 may be parallel to a length direction L and/or axial direction CA of the rod-shaped element 31.

The rod-shaped element 31 may be configured to cooperate with the insertion groove 32 to guide the first and second panel 10,20 together during assembly. The rod-shaped element 31 may be configured to cooperate with the insertion groove 32 to guide the first and second panel 10,20 to the locked position by a displacement of the second panel surface 22 relative the first edge surface 11 in a first direction D1 and/or a second direction D2.

The rod-shaped element 31 may extend at a first angle $\alpha 1$ from the first edge surface 11, wherein the first angle $\alpha 1$ is within the range of about 10° to 80°, preferably within the range of about 40° to 50°, or preferably about 45°.

The rod-shaped element 31 may be arranged in a rod-element groove 35 at the first edge surface 11.

The number of rod-shaped elements 31 at the first edge surface 11 may be the same as the number of insertion grooves 32 at the second panel surface 22.

The rod-shaped element 31 may have a waxed surface to facilitate assembly.

According to an aspect the rod-shaped element 31 may be configured to be attached in the rod element groove 35 by friction.

According to an aspect the rod-shaped element 31 may be configured to be glued in the rod element groove 35.

According to an aspect the rod-shaped element 31, the rod element groove 35 and the insertion groove 32 have a substantially circular shape, although other shapes, such as triangular, rectangular, square, etc. are possible. When the rod-shaped element has a circular shape, the length direction L and axial direction CA of the rod-shaped element 31 is the same.

According to an aspect the rod-shaped element 31 is made from one or more of a wood-based material, a polymer material, preferably with an enforcement, such as glass fibre or a metal.

The sidewalls of the insertion groove 32, the locking groove 35, the first locking groove (12) and the second locking groove (13) may comprise material of the core of the first panel 10 or the second panel 20, dependent on in which panel they are made. According to an aspect the sidewalls may also be enforced with, e.g., plastic material, such as a thermoplastic material, metal and/or glass fibre.

The first edge surface 11 may comprise one or more of said rod-shaped element 31 and the second panel surface 22 may comprise one or more of said insertion groove 32, and vice versa. Three or more of said rod-shaped element and said insertion groove 32 may be arranged linearly, wherein each of the rod-shaped elements 31 is configured to be inserted into one of said insertion groove 32.

The insertion groove 32 may extend into the second panel surface 22 at a second angle $\alpha 2$ from the second panel surface 22, wherein the second angle $\alpha 2$ is within the range of about 10° to 80°, preferably within the range of about 40° to 50°, or preferably about 45°.

The first locking groove 12 may extend at a third angle $\beta$ from the first edge surface 11, wherein the third angle $\beta$ is within the range of about 10° to 80°, preferably within the range of about 40° to 50°, or preferably about 45°.

The second locking groove 13 may extend at a fourth angle $\gamma$ from the second panel surface 22, wherein the fourth angle $\gamma$ is within the range of about 10° to 80°, preferably within the range of about 40° to 50°, or preferably about 45°.

The first angle $\alpha 1$, the second angle $\alpha 2$, the third angle $\beta$ and the fourth angle $\gamma$ may be essentially the same. For example, the first angle, the second angle, the third angle and the fourth angle may be within 2° of each other. Further, the first angle, the second angle, the third angle and the fourth angle may be the same. The first angle $\alpha 1$, the second angle $\alpha 2$, the third angle $\beta$ and the fourth angle $\gamma$ may all be $\neq 90°$.

Figure 1B:
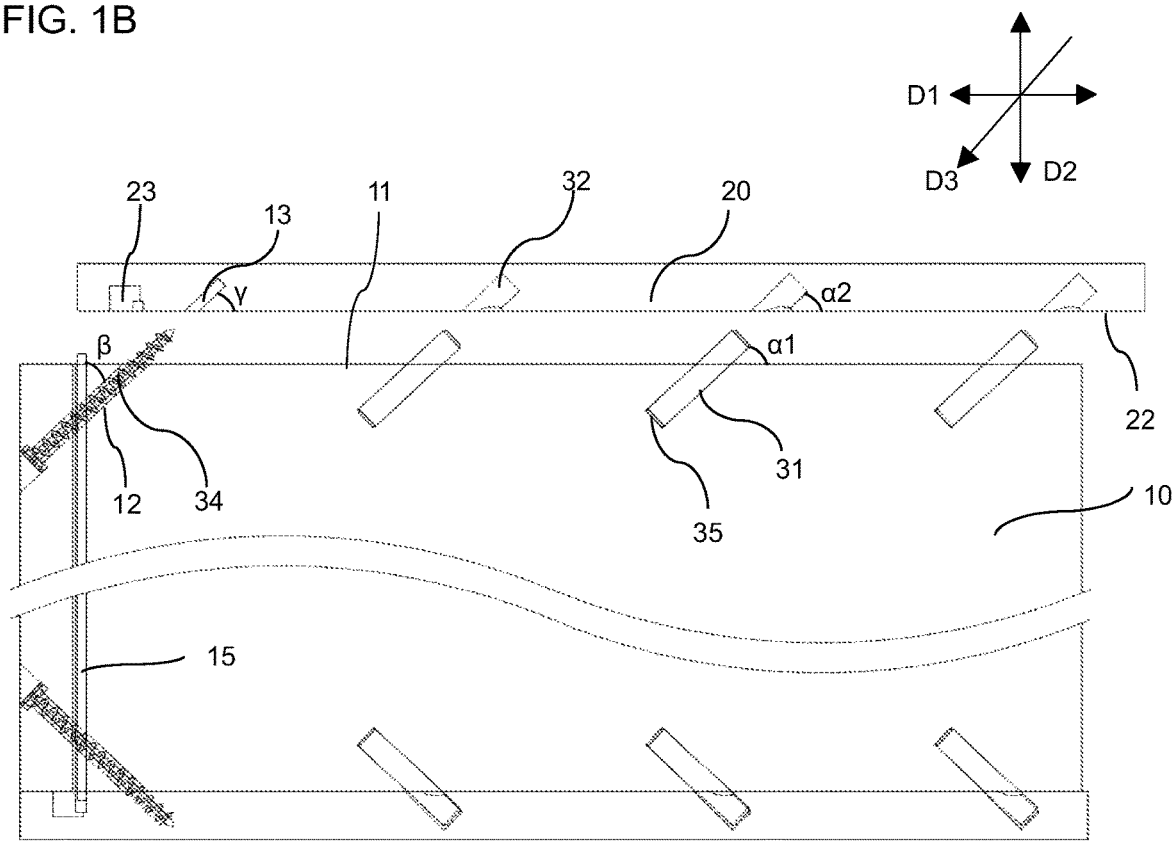
FIG. 1B shows an embodiment of the first panel and the second panel in a side-view in a non-locked position. The locking part is a screw.
Figure 2A:
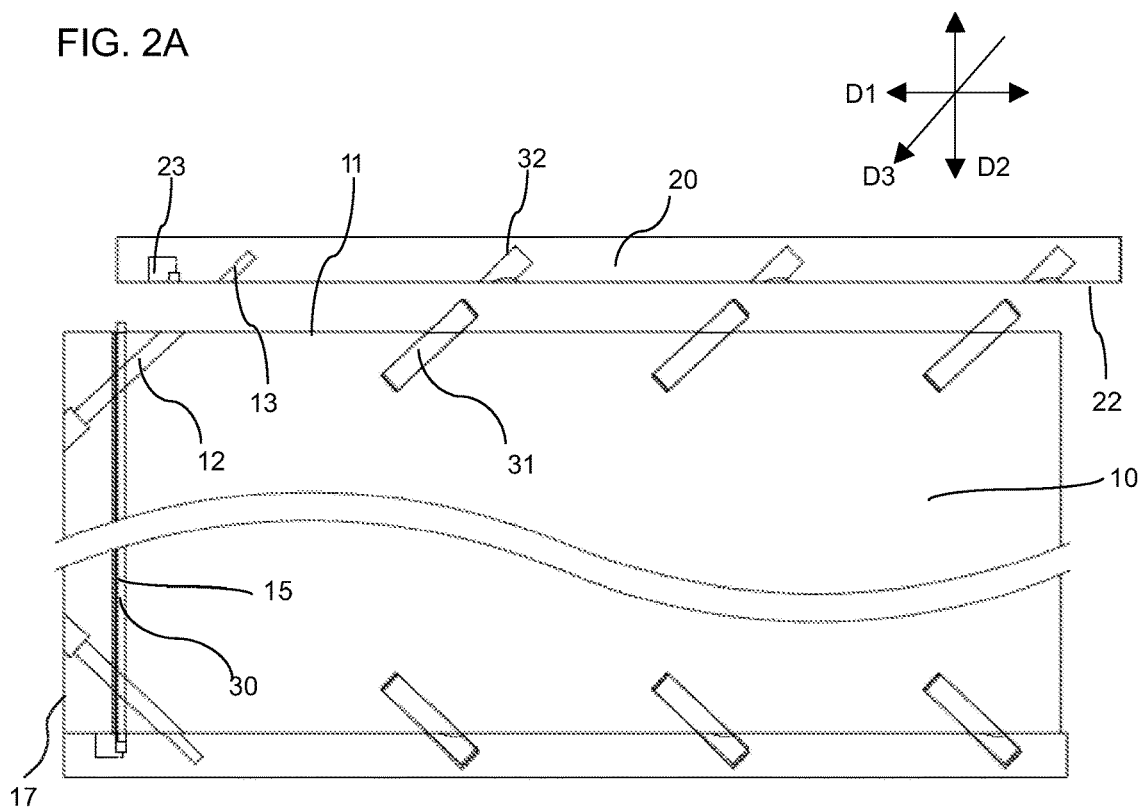
FIG. 2A shows an embodiment of the first panel and the second panel in a side-view in a non-locked position.
Figure 2B:
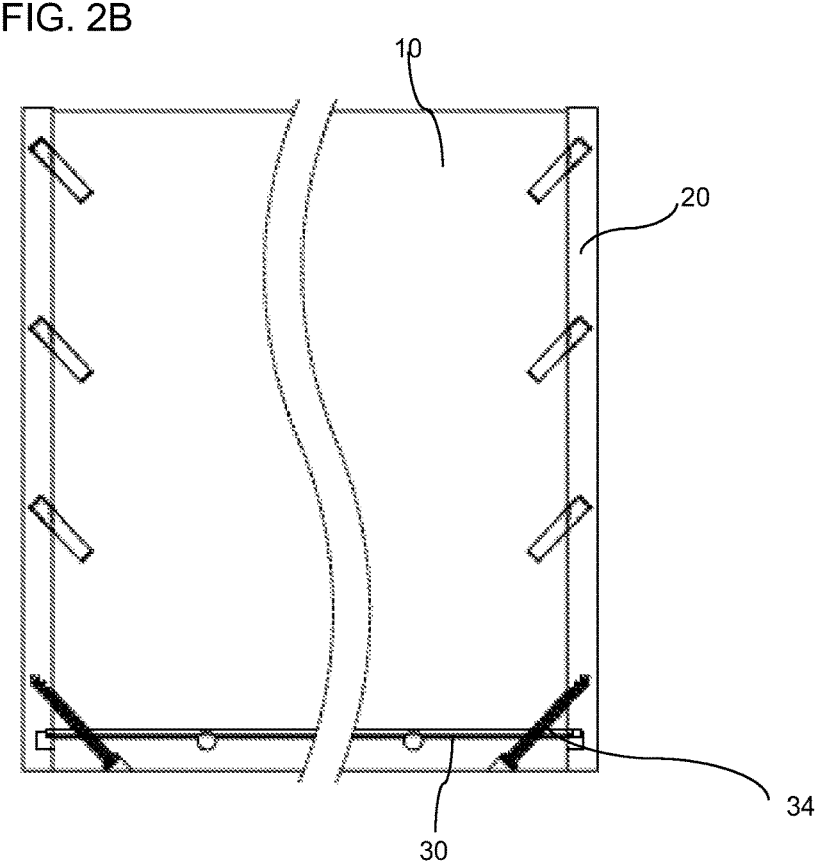
FIG. 2B shows an embodiment of the first panel and the second panel in a side-view in a locked position. The locking part is a screw.

In one embodiment, as shown in FIGS. 1B and 2B, the locking part 34 is a screw. The screw may extend into the second panel 20 during assembly.

The second locking groove 13 at the second panel surface 22 does not have to be a groove or drill hole as wide as the locking part 34 and/or as deep as the intended extent of the locking part 34 into the second panel, but may be, e.g., a small recess or the like, which may guide the locking part 34 into a correct place, especially for the embodiment where the locking part is a screw.

The first locking groove 12 may extend from a second edge surface 17 to the first edge surface 11.

In one embodiment, as shown in FIGS. 1A, 3, and 4A-5C, the locking part 34 is of the type cam and dowel connector. The cam and dowel connector may comprise at least one connecting element 51, such as a bolt 51, and at least one connector housing 52.

The cam and dowel connector may comprise an expanding part 56. The expanding part 56 is configured to expand in the second locking groove 13 such that the expanding part 56 is attached to the second locking groove 13. The connecting element 51 may extend from the connector housing 52 to the expanding part 56.

The connector housing 52 may be positioned in a first opening 40 on the first panel 10.

Figure 4A:
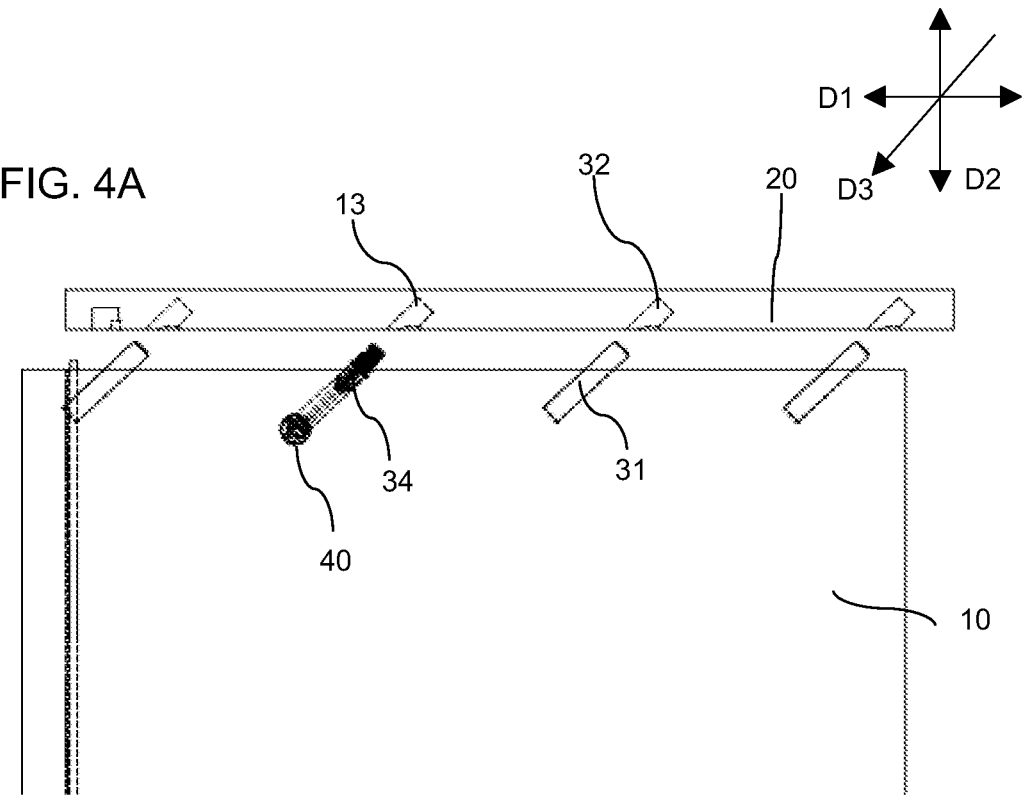
FIGS. 4A-4B show an embodiment of the first and the second panel in a side-view in a non-locked position and in a locked position. The locking part is of the type cam and dowel connector.

The bolt 51 of the cam and dowel connector may be positioned in the first locking groove 12 before assembly of the first panel 10 and the second panel 20, which is shown in the embodiments in FIGS. 1A and 4A.

Cam and dowel connectors are known in the art of assembly of furniture. The cam may be a cylindrical lock with an opening for the dowel. The cam/connector housing, which does the latching, may be actuated by rotary motion, typically through 90 or 180 degrees, with rotating excentres or wedges acting on a head of the dowel. The dowel is typically a bolt, pin, or screw.

Cam and dowel connector, when actuated pulls the second panel surface 22 relative the first edge surface 11 in the first direction D1 and the rod-shaped element 31 may be configured to cooperate with the insertion groove 32 to lock the first and the second panel 10,20 in the second direction D2. This may have the advantage of enabling optional placement of the locking part 34 along the panel edge 11, preferably in a less visible location on an assembled furniture. Furthermore, only one locking part 34 may be used to lock the first and second panel and still have a strong locking along the whole panel edge of the first and second panel 10,20 which may include one or more rod-shaped elements 31.

As shown, e.g., in FIGS. 1A-2A and 6A, the set may comprise a first panel groove 15 on a first panel surface 16 of the first panel 10, and a second panel groove 23 on the second panel surface 22 of the second panel 20. The set may further comprise a back panel 30 configured to be inserted in, and optionally to cooperate with, the first and second panel groove 15, 23.

Figure 3:
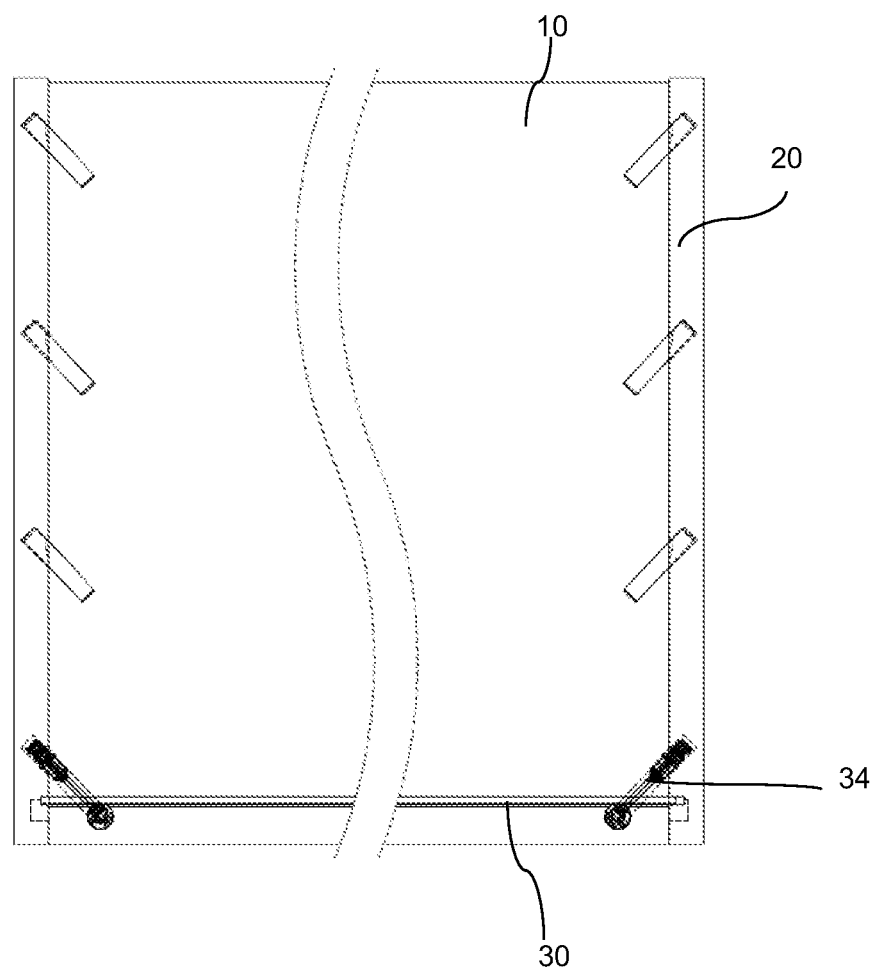
FIG. 3 shows an embodiment of the first panel and the second panel in a side-view in a locked position. The locking part is of the type cam and dowel connector.

The first opening 40 may be positioned between the panel groove 15 and the second edge surface 17, as, e.g., is shown in FIGS. 1A, 3 and 5A. This gives an aesthetic result since the locking device is no longer visible after assembly of the panels, but is hidden behind the back panel 30 if a back panel 30 is present.

FIG. 5B shows that the locking groove 12 may be positioned under the panel groove 15. The first panel 10 may comprise a third panel surface 54 which is opposite to the first panel surface 16. The locking groove may be positioned between a bottom surface 53 of the panel groove 15 and the third panel surface.

FIG. 5C shows that the first opening 40 may be positioned in the second edge surface 17 of the first panel 10.

Figure 4B:
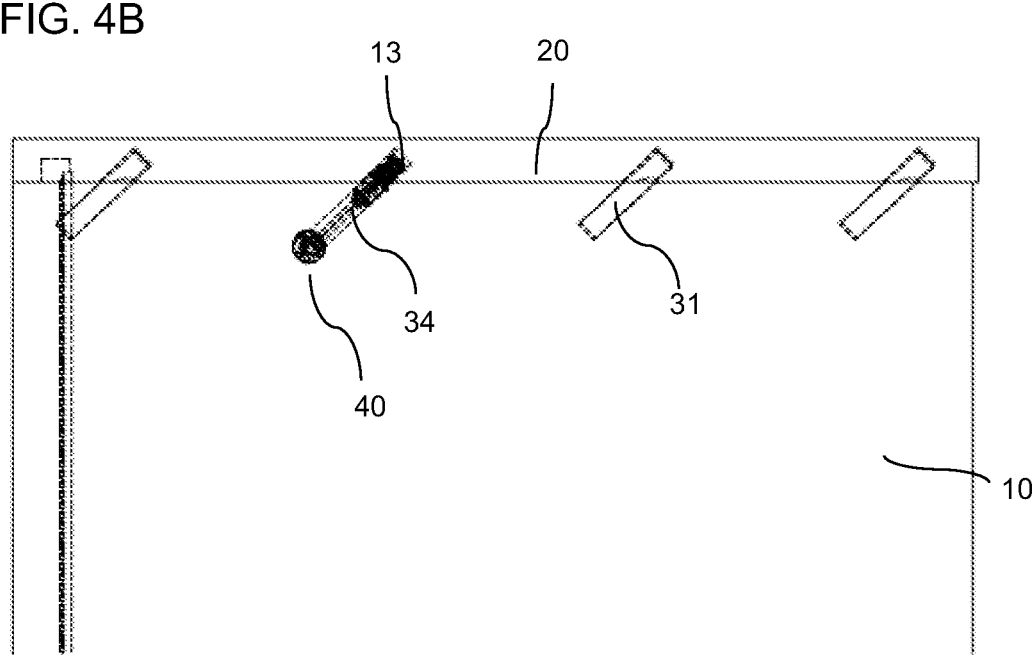
Figure 6A:
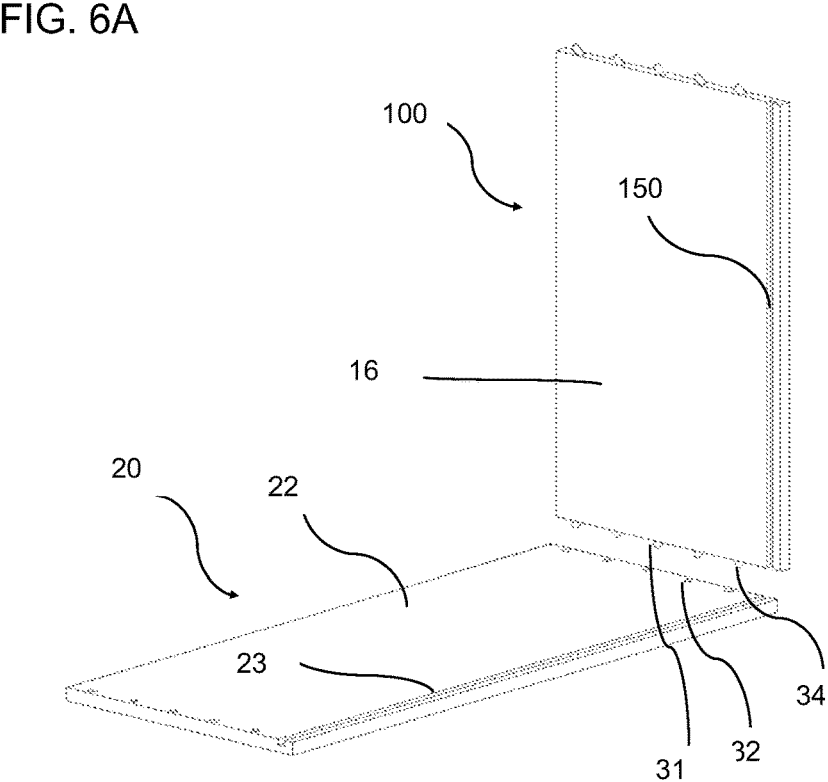
FIG. 6A-6B show embodiments of the first and second panel in a 3D-view in a non-locked position.
Figure 6B:
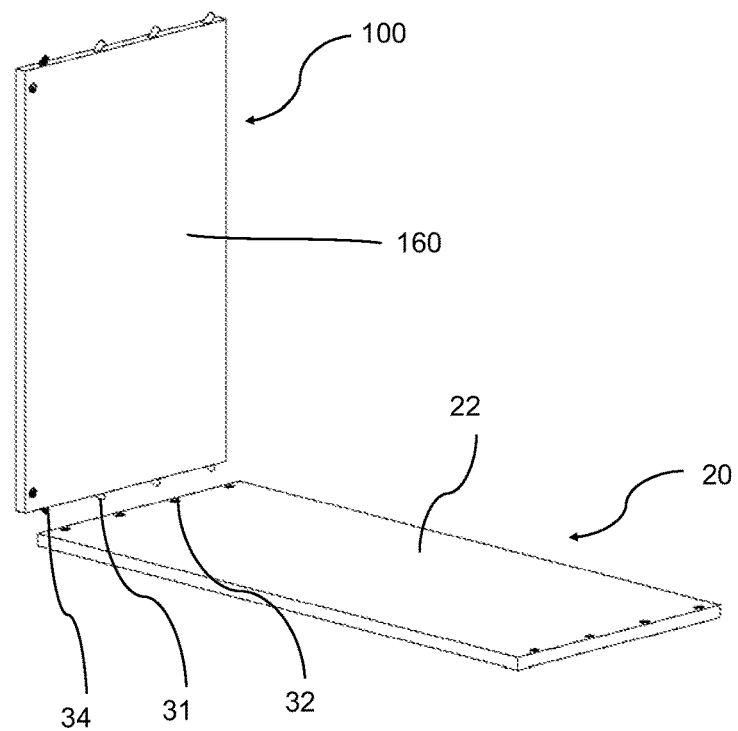

The first opening 40 may be in a position that will not be hidden by a back panel 30, as shown in FIGS. 4A-4B, which show an embodiment with the first and second panel 10,20 in a non-locked and a locked position. Thus, the first opening 40, and, e.g., the cam inserted therein, might be visible.

The insertion groove 32, the first locking groove 12, the second locking groove 13 and/or the first opening 40 may be a drill hole. The drill-holes may be bottom-ended drill holes.

The locking part 34 may be configured to cooperate with the first locking groove 12 and/or the second locking groove 13. For example, the locking part 34 may engage with the sidewalls of the first locking groove and/or the sidewall of the second locking groove to create a pulling force in the second direction D2. In an embodiment, the locking part 34 may engage with the sidewall of the second locking groove, but not the sidewall of the first locking groove, to create a pulling force in the second direction D2. This gives a strong locking of the first panel 10 to the second panel 20.

In one embodiment, the first edge surface 11 may have one first locking groove 12 and the second panel surface may have one second locking groove 13. According to this embodiment, only one locking part 34 is necessary for locking of the first panel 10 to the second panel 20.

According to an aspect the first panel 10 and the second panel 20 may be assembled by displacing the first panel 10 relative the second panel 20 in a direction which is essentially parallel with the second panel surface 22. The last part of the assembly may be in a direction that is essentially parallel to at least one of the first angle α1, the second angle α2, the third angle β and the fourth angle γ.

Figure 7A:
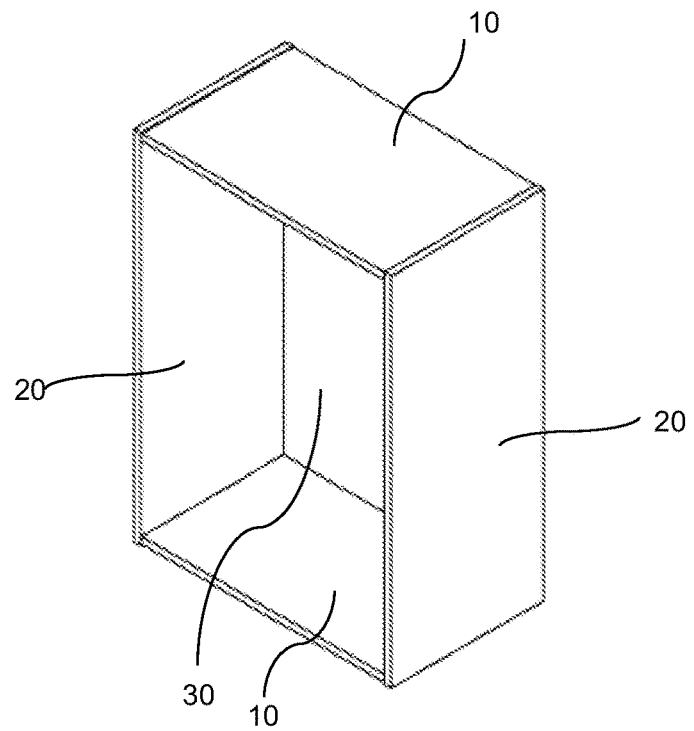
FIGS. 7A-7B show different 3D-views of an embodiment of a set of panels according to the invention in an assembled state.
Figure 7B:
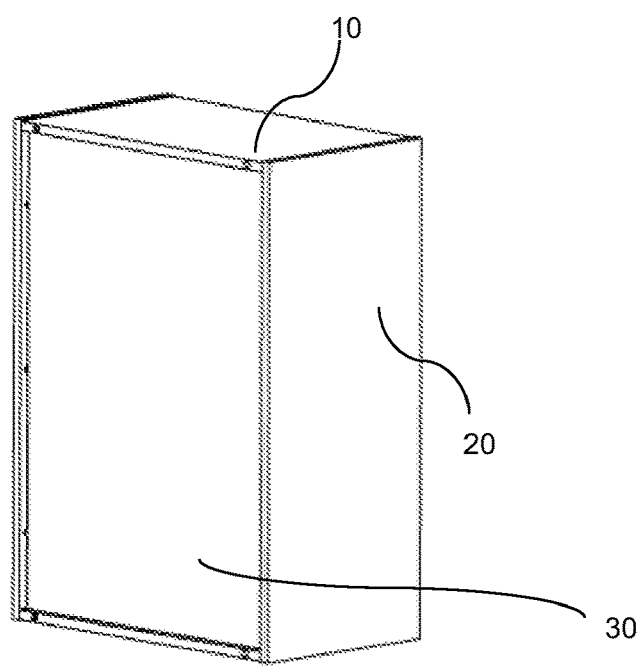

FIGS. 7A-7B show 3D-views of an embodiment of the invention in a locked position. The embodiment comprises two of said first panel 10 and two of said second panel 20 which are assembled as a frame of, e.g., a furniture. The embodiment further comprises a back panel which is assembled to the frame. The mechanical locking device is not visible from a side-view and/or a front-view when the panels are assembled, giving a very aesthetic result. Parts of the mechanical locking device may be seen from a back-view of the embodiment.

The core of the first panel 10 and/or of the second panel 20 may be a wood-based core, preferably made of MDF, HDF, OSB, WPC, plywood, or particleboard. The core may also be a plastic core comprising thermosetting plastic or thermoplastic, e.g., vinyl, PVC, PU or PET. The plastic core may comprise fillers.

The first panel 10 and/or the second panel 20 may also be of solid wood.

The first panel 10 and/or the second panel 20 may be provided with a decorative layer, such as a foil or a veneer, on one or more surfaces.

According to an aspect the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is preferably printed, for example by direct printing, rotogravure, or digital printing. According to an aspect the decorative layer comprise melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise a wood base core, such as HDF, MDF, plywood, particleboard, OSB or Masonite.

The different aspects, embodiments and alternatives described above may be combined with one or more of the other described aspects, embodiments, and alternatives.

The invention claimed is:

1. A set comprising a first furniture panel, a second furniture panel and a mechanical locking device for locking the first furniture panel to the second furniture panel, wherein:
    the first furniture panel comprises a first edge surface,
    the second furniture panel comprises a second panel surface,
    the first edge surface is facing the second panel surface in a locked position of the first and second furniture panels,
    the mechanical locking device comprises at least one rod-shaped element at the first edge surface and at least one insertion groove at the second panel surface,
    the rod-shaped element is configured to be inserted into the insertion groove,
    the mechanical locking device further comprises at least one first locking groove at the first edge surface and at least one second locking groove at the second panel surface and at least one locking part,
    the locking part is configured to be inserted into the first locking groove and the second locking groove,
    the locking part is configured to apply a locking force between the first and second furniture panels in an oblique direction in relation to the second panel surface, the oblique direction being at an acute angle to the second panel surface,
    at least part of the locking part is positioned in a first opening on the first furniture panel, and
    the first opening is positioned between a first panel groove located on a first panel surface of the first furniture panel and a second edge surface of the first furniture panel.

2. The set as claimed in claim 1, wherein the locking part is configured to pull the first furniture panel and the second furniture panel together in an assembly direction.

3. The set as claimed in claim 1, wherein the rod-shaped element is configured to cooperate with the insertion groove to guide the first and second furniture panels together during assembly.

4. The set as claimed in claim 1, wherein the rod-shaped element is configured to cooperate with the insertion groove to guide the first and second furniture panels to the locked position by a displacement of the second panel surface relative the first edge surface in a first direction and/or a second direction.

5. The set as claimed in claim 1,
    wherein the rod-shaped element extends at a first angle from the first edge surface, the first angle being within the range of about 10° to 80°,
    wherein the insertion groove extends into the second panel surface at a second angle from the second panel surface, the second angle being within the range of about 10° to 80°,
    wherein said first locking groove extends at a third angle from the first edge surface, the third angle being within the range of about 10° to 80°, and
    wherein said second locking groove extends at a fourth angle from the second panel surface, the fourth angle being within the range of about 10° to 80°.

6. The set as claimed in claim 1, wherein the rod-shaped element extends at a first angle from the first edge surface, wherein the insertion groove extends into the second panel surface at a second angle from the second panel surface, wherein said first locking groove extends at a third angle from the first edge surface, wherein said second locking groove extends at a fourth angle from the second panel surface, and wherein the first angle, the second angle, the third angle and the fourth angle are all not equal to 90°.

7. The set as claimed in claim 1, wherein the rod-shaped element extends at a first angle from the first edge surface, wherein the insertion groove extends into the second panel surface at a second angle from the second panel surface, wherein said first locking groove extends at a third angle from the first edge surface, wherein said second locking groove extends at a fourth angle from the second panel surface, and
    wherein the first angle, the second angle, the third angle and the fourth angle are essentially the same.

8. The set as claimed in claim 1, wherein the locking part is a screw which extends into the second furniture panel during assembly.

9. The set as claimed in claim 1, wherein the second edge surface is adjacent the first edge surface, and wherein the first locking groove extends from the second edge surface to the first edge surface.

10. The set as claimed in claim 1, wherein the locking part includes a cam and dowel connector, and wherein the cam and dowel connector comprises at least one bolt and at least one connector housing.

11. The set as claimed in claim 10, wherein the bolt of the cam and dowel connector is positioned in the first locking groove before assembly of the first furniture panel and the second furniture panel.

12. The set as claimed in claim 10, wherein the connector housing is positioned in the first opening on the first furniture panel.

13. The set as claimed in claim 1, wherein the set comprises a second panel groove on the second panel surface of the second furniture panel.

14. The set as claimed in claim 13, wherein the set further comprises a back panel configured to be inserted in, and optionally to cooperate with, the first and second panel groove.

15. The set as claimed in claim 1, wherein the insertion groove, the first locking groove, the second locking groove and/or the first opening is a bottom-ended drill hole.

16. The set as claimed in claim 1, wherein the locking part is configured to cooperate with the first locking groove and/or the second locking groove.

17. The set as claimed in claim 1, wherein the first edge surface comprises one first locking groove and the second panel surface comprises one second locking groove.

18. The set as claimed in claim 1, wherein the rod-shaped element is arranged in a rod-element groove at the first edge surface.

19. The set as claimed in claim 1, wherein the number of rod-shaped elements at the first edge surface is the same as the number of insertion grooves at the second panel surface.

20. The set as claimed in claim 1, wherein the oblique direction is essentially parallel to a length direction and/or axial direction of the rod-shaped element.

* * * * *